United States Patent [19]

Waite

[11] Patent Number: 4,488,831
[45] Date of Patent: Dec. 18, 1984

[54] WIRE AND PIN CONNECTOR ARRANGEMENT

[75] Inventor: Lynn E. Waite, Gasport, N.Y.

[73] Assignee: General Motors Corporation, Detroit, Mich.

[21] Appl. No.: 530,550

[22] Filed: Sep. 9, 1983

[51] Int. Cl.³ ............................................. F16G 11/00
[52] U.S. Cl. ................................. 403/209; 74/501 R; 411/530
[58] Field of Search ............ 403/206, 209, 207, 397; 74/501 P, 501 R; 411/530

[56] References Cited

U.S. PATENT DOCUMENTS

| 2,865,662 | 12/1958 | Nurmse ........................ 411/530 X |
| 3,587,341 | 6/1971 | Fiddler ............................ 74/501 R |
| 3,945,267 | 3/1978 | Stimpson ....................... 74/501 R |

FOREIGN PATENT DOCUMENTS 105581 9/1942 Sweden ................................. 403/209

Primary Examiner—Andrew V. Kundrat
Attorney, Agent, or Firm—R. L. Phillips

[57] ABSTRACT

A push-pull wire and pin connector arrangement is disclosed comprising a wire having a both partial loop adapted to extend in and along a groove in a pin and a deflectable full loop opposite the partial loop adapted to be arranged external of the pin so that a portion of the full loop is deflectable to enable engagement of the partial loop in the groove and thereafter remain deflected to a reduced degree by engaging the pin in the groove opposite the partial loop to thereby effect and maintain a spring-loaded tight connection between the wire and pin.

4 Claims, 3 Drawing Figures

WIRE AND PIN CONNECTOR ARRANGEMENT

This invention relates to a wire and pin connector arrangement and more particularly to a wire end loop configuration that is self-retaining in cooperation with the pin to effect a tight connection and without requiring a separate retainer.

In the connection for example of a push-pull wire to a crankpin such as used to control an air valve in automotive air conditioning and heater systems, it is common practice to form a loop or hook on the wire that is received over the crankpin and retained thereon by a separate fastener. Alternatively, a special separate fastener may be employed to secure the wire without requiring any forming thereof. In such arrangements and unless tolerances are held tight, there will generally be a looseness in the control which can be undesirable.

The present invention avoids the added cost and assembly of a separate fastener yet assures tightness by a specific configuration of both the pin and wire. In the preferred embodiment, the pin is provided with an annular groove extending thereabout and the wire is specially shaped to engage and be retained against the pin in the groove. The wire is configured at its connecting end to have both a partial loop that is adapted to extend in and along the groove and a deflectable full loop that is opposite the partial loop and is adapted to be arranged external of the pin but also engages in the groove. A portion of the full loop adjacent the end of the wire is deflectable to enable engagement of the partial loop at its inner loop side and the full loop at its outer loop side in the groove and thereafter on release of the load, the full loop portion remains deflected to a reduced degree on engaging the pin in the groove opposite the partial loop. There is thus effected and maintained a spring-loaded tight connection between the wire and pin wherein the partial loop exerts a pulling load on the pin and the full loop exerts a pushing load on the pin on pulling and pushing respectively of the wire.

These and other objects, advantages and features of the present invention will become more apparent from the following description and drawing in which.

Figure 1:
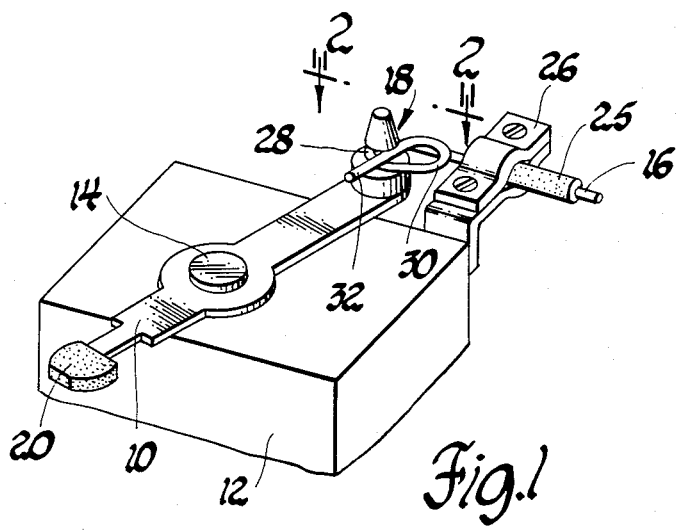
FIG. 1 is an isometric view of the preferred embodiment of the wire and pin connector arrangement according to the present invention.

Referring to FIG. 1, there is shown a hand-operated lever 10 which is mounted on a support 12 by a pivot pin 14 and is connected to operate a sheathed rod or wire 16 to control some device such as the air valve in an automotive air conditioning and heating system (not shown). For the connection of the lever 10 to the wire 16, there is provided a crankpin 18 which is fixed to the end of the lever opposite the operator's end 20. The crankpin 18 extends parallel to the lever's pivot axis and is formed at its end with a frustum 22 which tapers outward to an adjacent annular groove 24. The wire 16 slides in a sheath 25 that is secured to the support 12 by a bracket 26 and extends out from the sheath past the bracket to make connection with the crankpin.

Figure 2:
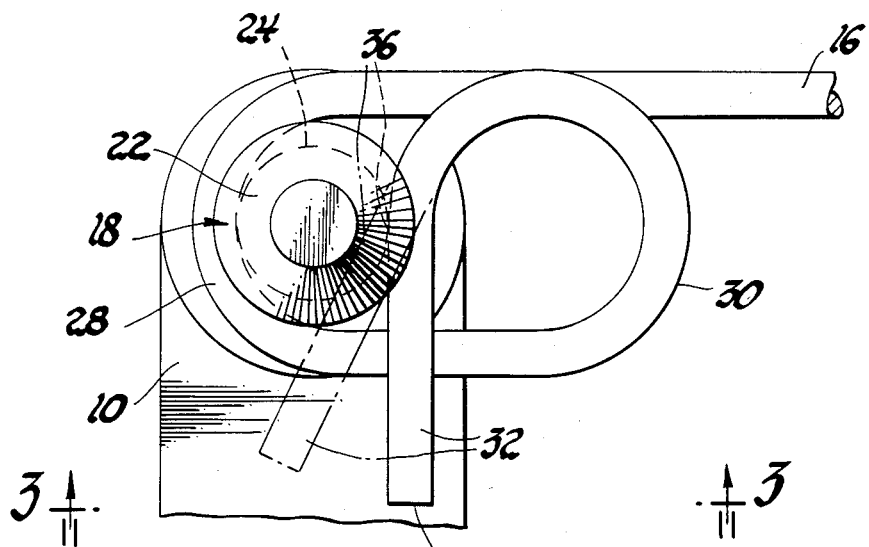
FIG. 2 is an enlarged view taken along the line 2—2 in FIG. 1.
Figure 3:
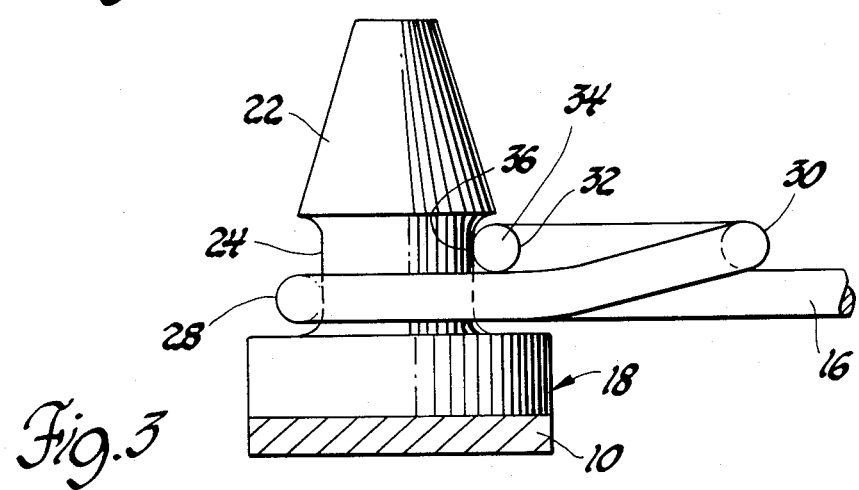
FIG. 3 is a view taken along the line 3—3 in FIG. 2.

The wire 16 is made of steel and the projecting end thereof as best seen in FIGS. 2 and 3 is formed with both a half loop 28 that is adapted to extend in and half way about and engage at its inner or inner loop side with the crankpin groove 24 and a deflectable full loop 30 that is adapted to be arranged external of the crankpin but still engage at its outer loop side with the groove 24. For the latter engagement, the full loop 30 is further formed with a straight portion 32 which extends to the free end 34 of the wire and is deflectable by application of a transverse load away from the pin from its as-formed or free state position shown in phantom-line in FIG. 2 to enable reception of the partial loop 28 and the straight portion 32 over the pin and into the groove to assume the installed position shown in solid line. The application of such load is effected without any assembly tool simply by wedging the partial loop 28 down on the frustum 22 until it and the straight portion 32 clear the large diameter thereof. After passing into the groove, the deflected straight portion 32 engages the groove opposite the partial loop 28 at the point 36 on its outer side but remains deflected to a predetermined substantial degree sufficient to effect and maintain a spring-loaded tight connection between the wire and pin wherein the partial loop exerts a pulling load at its inner radius on the pin and the full loop exerts a pushing load at its outer loop side on the pin on pulling and pushing respectively of the wire. To disconnect, the straight wire portion 32 is simply grasped near the end 34 and deflected to clear the groove 24 at the large diameter of the frustum 22.

The above described preferred embodiment is illustrative of the invention which may be modified within the scope of the appended claims.

The embodiments of the invention in which an exclusive property or privilege is claimed are defined as follows:

1. A push-pull wire and pin connector arrangement comprising a pin having an annular groove, and a push-pull wire having both a first loop adapted to extend in and about and engage at its inner loop side with said groove and a deflectable second loop opposite said first loop adapted to be arranged external of said pin so that a portion of said second loop is deflectable to enable engagement of said first loop and said second loop in said groove and thereafter remains deflected to a reduced degree by engaging at its outer loop side with said groove opposite said first loop to thereby effect and maintain a spring-loaded tight connection between said wire and pin wherein said pin is encircled by said wire at said loops to positively prevent their disengagement by pushing or pulling on said wire.

2. A push-pull wire and pin connector arrangement comprising a pin haing an annular groove, and a push-pull wire having both a partial loop adapted to extend in and about and engage at its inner loop side with said groove and a deflectable full loop opposite said partial loop adapted to be arranged external of said pin so that a portion of said full loop is deflectable to enable engagement of said partial loop and said full loop in said groove and thereafter remains deflected to a reduced degree by engaging at its outer loop side with said groove opposite said partial loop to thereby effect and maintain a spring-loaded tight connection between said wire and pin wherein said pin is encircled by said wire at said loops to positively prevent their disengagement by pushing or pulling on said wire.

3. A push-pull wire and pin connector arrangement comprising a pin having an annular groove, and a push-pull wire having both a half loop adapted to extend in and about and engage at its inner loop side with said groove and a deflectable full loop opposite said half loop adapted to be arranged external of said pin so that a portion of said full loop adjacent a free end of said wire is deflectable by application of a transverse load to enable engagement of said half loop and said full loop in said groove and thereafter on release of said load said full loop portion remains deflected to a reduced degree by engaging at its outer loop side with said groove opposite said half loop to thereby effect and maintain a spring-loaded tight connection between said wire and pin wherein said half loop exerts a pulling load on said pin and said full loop exerts a pushing load on said pin on pulling and pushing respectively of the wire and wherein said pin is encircled by said wire at said loops to positively prevent their disengagement by pushing or pulling on said wire.

4. A push-pull wire and pin connector arrangement comprising a pin having a wedge-shaped portion and an adjacent annular groove, and a push-pull wire having both a partial loop adapted to extend in and about and engage at its inner loop side with said groove and a deflectable full loop opposite said partial loop adapted to be arranged external of said pin so that a portion of said full loop is deflectable by wedging action of said wedge-shaped portion between said partial loop and said full loop portion to enable engagement of said partial loop and said full loop in said groove whereafter said full loop portion remains deflected to a reduced degree by engaging at its outer loop side with said groove opposite said partial loop to thereby effect and maintain a spring-loaded tight connection between said wire and pin wherein said pin is encircled by said wire at said loops to positively prevent their disengagement by pushing or pulling on said wire.

* * * * *